UNITED STATES PATENT OFFICE.

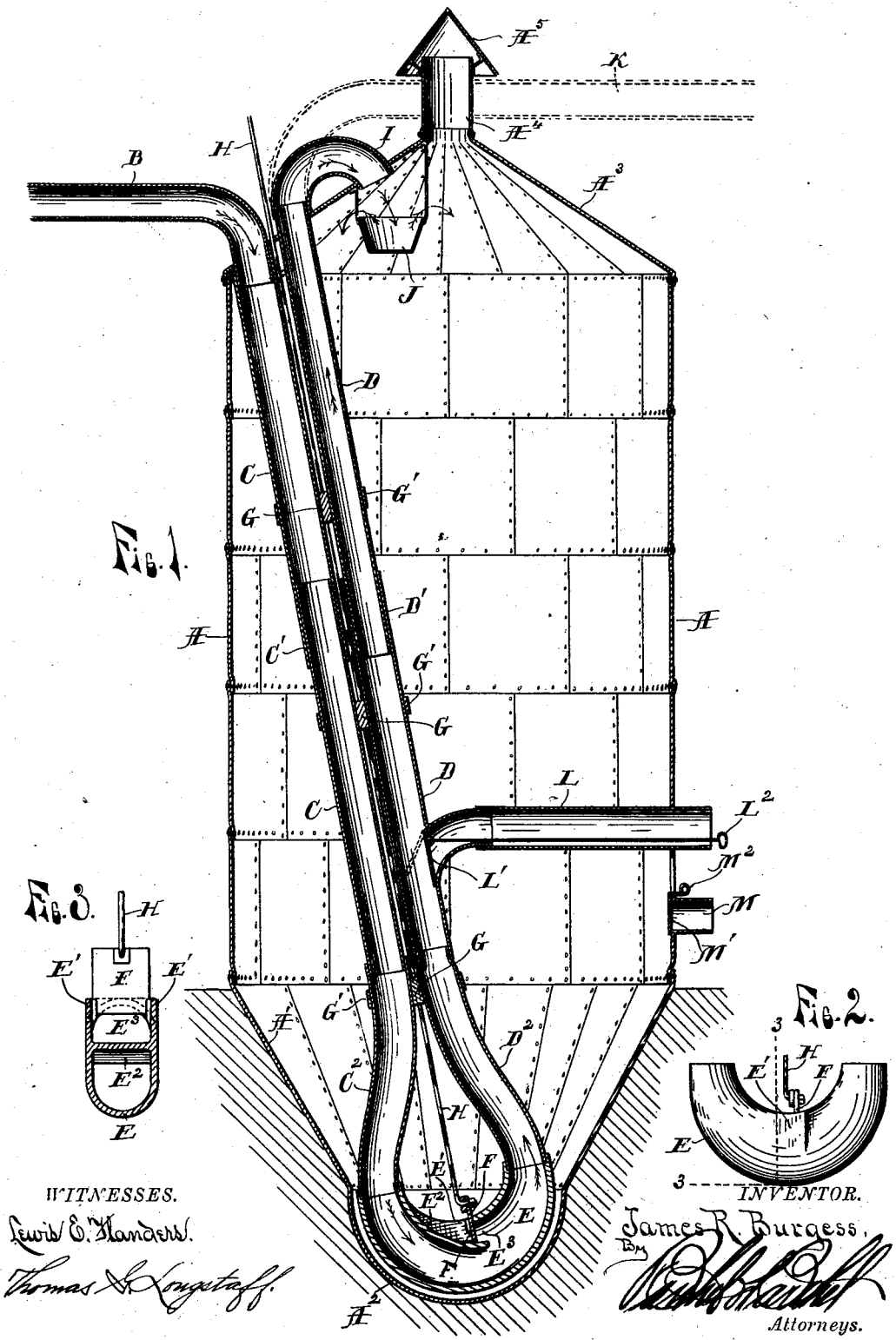

JAMES R. BURGESS, OF PORT HURON, MICHIGAN.

PNEUMATIC CONVEYER.

SPECIFICATION forming part of Letters Patent No. 721,145, dated February 24, 1903.

Application filed October 13, 1902. Serial No. 127,072. (No model.)

*To all whom it may concern:*

Be it known that I, JAMES R. BURGESS, a citizen of the United States of America, residing at Port Huron, in the county of St. Clair and State of Michigan, have invented certain new and useful Improvements in Pneumatic Conveyers, of which the following is a specification, reference being had therein to the accompanying drawings.

My invention relates to new and useful improvements in pneumatic conveyers for use in handling grain, &c., and it is especially adapted for use in connection with steel storage-tanks to force the grain therefrom or to aerate the grain by turning it over therein, as by conveying it from the bottom of the tank to the top thereof; and its object is to provide a simple, compact, and inexpensive conveyer adapted to be placed within a steel storage-tank and form a part thereof or to be used independently of the tank for loading and unloading ships, cars, and other conveyances.

To this end the invention consists in providing a conveyer-tube with a return-bend having an opening or mouth controlled by a suitable gate and in the construction and combination of the tank and conveyer and in the peculiar arrangement of tube connections; and it consists, further, in providing certain other new and useful features, all as hereinafter more fully described, reference being had to the accompanying drawings, in which—

Figure 1 is a vertical central section of a device embodying my invention, showing the conveyer in position for use within my improved form of tank; Fig. 2, a side elevation of the mouthpiece or shoe, and Fig. 3 a section on the line 3 3 of Fig. 2.

A is a storage-tank for grain, preferably made of sheet-steel and cylindrical in form, the bottom $A'$ being conical and extended downward to connect with a pit $A^2$, said conical portion and pit being preferably below the surface of the ground. The conical top $A^3$ of the tank terminates in an open flue $A^4$, provided with a hood $A^5$.

B is an air-tube leading from a suitable fan or blower (not shown) and bent near the top of the tank to connect with the tube C through an opening in the top of the tank, and which tube is made in two parts, one telescoping within the other at $C'$. Extending through the top of the tank adjacent to the tube C and downward therein parallel with said tube is a similar tube D, which is made in two parts telescoping one within the other at $D'$, and the lower ends of these tubes C and D are provided with curved portions $C^2$ $D^2$, connecting said tubes with the ends of the mouthpiece or shoe E, which consists of a semicircular-shaped casting open at its ends to receive said tubes and provided with the vertical walls $E'$ at its upper concave side, extending about one-half of its length. Between these walls is formed the inclined bottom $E^2$, extending downward within the mouthpiece, said walls and bottom forming a throat through which the grain enters, and a gate F, movable in vertical ways, is provided to close the mouth or opening $E^3$ at the end of the throat. The portions $C^2$ $D^2$ and the mouthpiece connect the tubes C D to form a continuous air-tube having a return-bend, and the mouthpiece is supported in the bottom of the pit $A^2$, which is of a size to receive and hold the same in place, the grain in the tank being guided to the throat by the conical bottom $A'$.

Blocks G are interposed at intervals between the tubes C and D, and straps $G'$ embrace said tubes and hold them against the blocks. A rod H is secured at one end to the gate F to operate the same and extends upward through the blocks G, which serve as guides for said rod.

To the upper end of the tube D, which projects through the top of the tank, is attached one end of a semicircular pipe I, the opposite end thereof being extended through an opening in the top of the tank, and a deflector J is supported from the tank-top beneath the end of said pipe to cause the grain discharged therefrom to spread out and be distributed in the tank and more thoroughly aerated. This pipe I is used when it is desired to simply aerate the grain in the tank; but when it is desired to convey the grain from the tank to another tank or to a car or other conveyance a pipe K (shown in dotted lines) is substituted for the pipe I.

A branch tube L, adapted for use in loading cars, &c., is also shown leading from the tube D, near its lower end, outward through the side of the tank, and the tank is provided with a spout M a short distance above the ground, through which all the grain in the upper end of the tank may be drawn off by gravity when it is feasible to use this spout. To close the tube L when not in use and to direct the grain and air into the same when in use, a hinged door L' is provided, which is adapted to close the opening into the tube L when in one position and to project across the tube D in its other position, a rod L² being provided in the tank to operate the door, and the spout M is provided with a sliding door M', operated by a handle M², projecting through a slot in the tank.

It is obvious that this conveyer may be used to unload ships, cars, or other conveyances, the tubes C D and attached mouthpiece forming an elevator-leg which may be lowered into the hold of a ship or a car, and the mouthpiece will settle into the grain by its own weight until it strikes the bottom, the parts of the tubes sliding upon each other as the mouthpiece works its way down. The grain entering the mouth is carried up the tube D by the current of air coming down the tube C and past the mouth E³, thus making a cheap and simple construction which is certain in its operation and adapted for use in connection either with storage-tanks or as a conveyer-leg for use in unloading vessels, cars, &c.

Having thus fully described my invention, what I claim is—

1. In a conveyer, an air-tube having straight parallel portions and a return-bend connecting said portions, said bend being provided with a throat and mouth in its concave side, vertical ways in the throat, a gate movable in said ways to close the mouth, and a rod to operate said gate secured thereto.

2. In a conveyer, the combination with a storage-tank for grain, of an air-tube extending downward within said tank to the bottom thereof and provided with a return-bend and extended upward through the top of the tank, said return-bend being provided with an opening or mouth, and a semicircular-shaped pipe detachably secured at one end to the end of the air-tube which extends upward through the top of the tank and having its opposite end projecting through the top of the tank to discharge the grain back into said tank.

3. In a pneumatic conveyer, the combination with a storage-tank provided with a pit at its bottom; of a telescopic air-tube extending through the top of said tank and downward within the same, a mouthpiece secured to the lower end of said tube consisting of a semicircular-shaped tubular casting provided with an opening or mouth in its upper concave side, a telescopic tube connected to the opposite end of said mouthpiece and extending upward parallel with the other tube and a gate to close the mouth.

4. In a pneumatic conveyer, the combination with two downwardly-extending parallel tubes having outwardly-curved lower ends, of a semicircular mouthpiece having a mouth and longitudinal parallel walls extending upward from its concave side, an inclined bottom between said walls to guide the grain to said mouth, vertical ways, a gate movable in said ways, and a rod secured at one end to said gate to operate the same.

5. In a pneumatic conveyer, the combination with a storage-tank having a conical bottom and a pit; of an air-pipe to conduct air from a blower, an air-tube consisting of parts telescopic one within the other connected at one end to said pipe, a laterally-curved portion secured to the other end of said tube, a semicircular tubular mouthpiece supported within said pit and secured at one end to said curved portion of the tube and provided with a mouth, a gate to close said mouth, a rod secured to said gate to operate the same, an air-tube consisting of telescopic sections extending parallel with the first-named tube and through the top of the tank, a laterally-curved portion connecting said last-named tube with the mouthpiece, a semicircular pipe detachably secured at one end to the upper end of said last-named tube and having its opposite end extending through an opening in the top of the tank, and a deflector secured to the top of the tank beneath the open end of the semicircular pipe.

6. In a pneumatic conveyer, the combination with two parallel tubes having outwardly-curved ends, a semicircular mouthpiece connecting said curved ends and having a mouth in its concave side; of a branch tube connected to one of said parallel tubes near its curved end, a door hinged to turn to close the opening from the parallel tube into the branch tube and to turn to project across the parallel tube and direct the grain into the branch tube, and a rod attached to said door to operate the same and extended outward through the branch tube.

7. In a pneumatic conveyer, the combination with a storage-tank, of an air-tube extended through the top of the tank and downward within the same, a semicircular mouthpiece in the bottom of the tank connected at one end to the lower end of said tube and provided with a mouth to admit the grain, a conveyer-tube connected at its lower end to the other end of said mouthpiece and extended upward parallel with the air-tube through the top of the tank, a pipe detachably connected to the upper end of said conveyer-tube to convey the grain away from the tank, a branch tube connected to the conveyer-tube and extended outward through the side of the tank, a door to close the opening from the conveyer-tube into the branch tube when closed and to direct the grain into the branch tube when open, a spout opening through the side of the tank near its lower end, a door to close the opening into said spout and means for operating said doors.

In testimony whereof I affix my signature in presence of two witnesses.

JAMES R. BURGESS.

Witnesses:
OTTO F. BARTHEL,
THOMAS G. LONGSTAFF.